(12) United States Patent
Shiraki et al.

(10) Patent No.: US 6,853,104 B2
(45) Date of Patent: Feb. 8, 2005

(54) MINIATURE MOTOR AND METHOD FOR MANUFACTURING THE SAME

(75) Inventors: Kenji Shiraki, Matsudo (JP); Hideki Itaya, Matsudo (JP)

(73) Assignee: Mabuchi Motor Co., Ltd., Chiba (JP)

(*) Notice: Subject to any disclaimer, the term of this patent is extended or adjusted under 35 U.S.C. 154(b) by 0 days.

(21) Appl. No.: 10/353,763

(22) Filed: Jan. 29, 2003

(65) Prior Publication Data

US 2003/0155825 A1 Aug. 21, 2003

(30) Foreign Application Priority Data

Feb. 19, 2002 (JP) .......................... 2002-41336

(51) Int. Cl.[7] .............................................. H02K 7/08
(52) U.S. Cl. .......................................... 310/90; 310/91
(58) Field of Search ................... 310/90, 91; 384/129, 384/126, 368, 520, 294; 29/596–589

(56) References Cited

U.S. PATENT DOCUMENTS

| | | | |
|---|---|---|---|
| 4,185,214 A | * | 1/1980 | Gerber et al. ................. 310/51 |
| 4,326,758 A | * | 4/1982 | Nozue et al. ................. 384/368 |
| 4,437,215 A | * | 3/1984 | Nozue et al. .......... 29/898.041 |
| 5,678,299 A | * | 10/1997 | Mochizuki et al. ........... 29/596 |
| 2004/0061282 A1 | * | 4/2004 | Stemmle ..................... 271/207 |

* cited by examiner

Primary Examiner—Tran Nguyen
Assistant Examiner—Leda Pham
(74) Attorney, Agent, or Firm—McGlew and Tuttle, P.C.

(57) ABSTRACT

A miniature motor includes a closed-bottomed cylindrical motor casing having a cylindrical bearing support portion projecting from a central portion of the bottom of the motor casing, a motor-casing-side bearing accommodated in the bearing support portion, a casing cover fitted to an open end portion of the motor casing, a casing-cover-side bearing accommodated in a central portion of the casing cover, and a rotor rotatably supported by means of the motor-casing-side bearing and the casing-cover-side bearing. The end face of the motor-casing-side bearing is concentrically polished at at least a portion which, when the rotor is urged toward the motor casing, abuts a washer provided on a shaft of the rotor. The above structure reduces sliding loss on the end face of an oil-impregnated bearing which receives a thrust load of the rotor generated due to rotation of the motor.

4 Claims, 3 Drawing Sheets

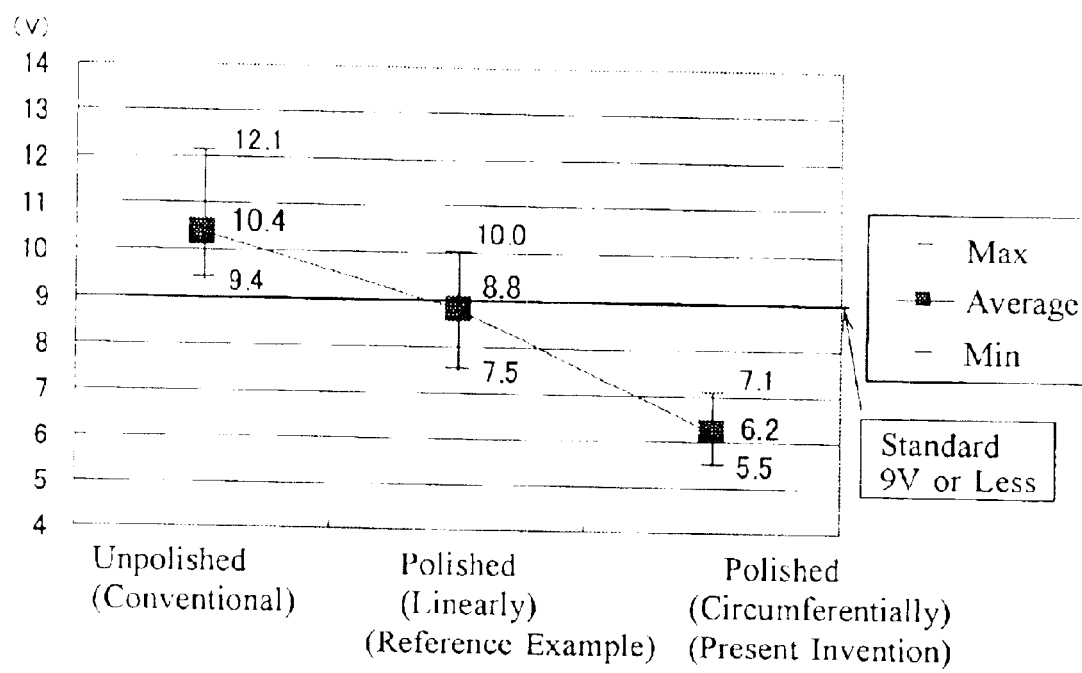

MINIATURE MOTOR AND METHOD FOR MANUFACTURING THE SAME

BACKGROUND OF THE INVENTION

1. Field of the Invention

The present invention relates to a miniature motor exhibiting reduced sliding loss on the end face of an oil-impregnated bearing which receives a thrust load of a rotor generated due to rotation of the motor, as well as to a method for manufacturing the miniature motor.

2. Description of the Related Art

A miniature motor having a worm reduction-gear functions such that a drive torque output from the motor is transmitted to a worm via a motor shaft, from the worm to a worm wheel, which is a helical gear, and from the worm wheel to an external load via an output shaft of the worm wheel. Upon startup of clockwise or counterclockwise rotation of such a miniature motor having a worm reduction-gear connected to an external load, a thrust force of the worm joined to the motor shaft acts in such a direction as to withdraw the shaft from a motor casing. As a result, the motor rotates while a washer on the shaft is pressed against a bearing.

In such a case where a worm is employed in a torque transmission system for transmission of torque to an external load, rotation of a motor induces a thrust load, and in some cases the minimum startup voltage of the motor increases due to a sliding loss associated with a frictional resistance between a washer on a rotor and the end face of an oil-impregnated bearing subjected to the thrust load. When the motor involving such a sliding loss is to be started, a greater amount of power is required as compared with a case of a motor that does not involve such a sliding loss. Therefore, in the case where a miniature motor having a worm reduction-gear is used to drive, for example, an air conditioner damper for use in an automobile, the miniature motor has involved a problem of failure to start up when the battery voltage is low as a result of, for example, low temperature.

SUMMARY OF THE INVENTION

An object of the present invention is to solve the above-mentioned problem, and to provide a miniature motor in which, even when a thrust load is induced by rotation of the motor, a sliding loss on the end face of an oil-impregnated bearing subjected to the thrust load is reduced to thereby avoid a problem of an increased minimum startup voltage of the motor or a problem of large power required for startup of the motor.

Another object of the present invention is to provide a method for manufacturing such a miniature motor.

To achieve the above object, the present invention provides a miniature motor comprising a closed-bottomed cylindrical motor casing having a cylindrical bearing support portion projecting from a central portion of the bottom of the motor casing, a motor-casing-side bearing accommodated in the bearing support portion, a casing cover fitted to an open end portion of the motor casing, a casing-cover-side bearing accommodated in a central portion of the casing cover, and a rotor rotatably supported by means of the motor-casing-side bearing and the casing-cover-side bearing. The end face of the motor-casing-side bearing is concentrically polished in a circumferential direction at at least a portion which, when the rotor is urged toward the motor casing, abuts a washer provided on a shaft of the rotor.

The present invention also provides a method for manufacturing a miniature motor, comprising the steps of providing the motor casing having the motor-casing-side bearing accommodated in the bearing support portion of the motor casing; setting the motor casing in a casing rest while a motor-casing-side bearing is accommodated in the bearing support portion of the motor casing; coaxially pressing a rotating polishing rod against the end face of the motor-casing-side bearing at at least a portion which abuts a washer provided on a shaft of the rotor, so as to concentrically polish the portion in a circumferential direction; and attaching the rotor in a completed form and the casing cover to the motor casing.

BRIEF DESCRIPTION OF THE DRAWINGS

FIG. 5 is a graph showing measurement results.

DETAILED DESCRIPTION OF THE PREFERRED EMBODIMENTS

Figure 1:
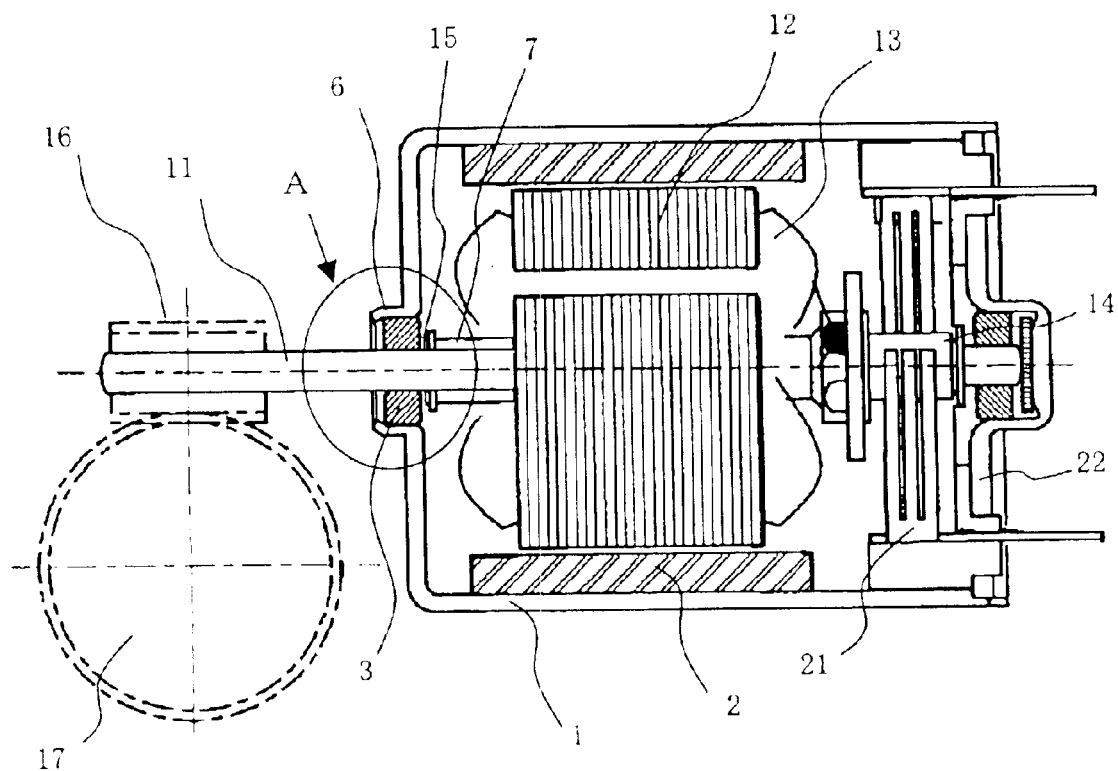
FIG. 1 is a view showing an example of a miniature motor having a worm reduction-gear to which the present invention is applicable.
Figures 2A, 2B:
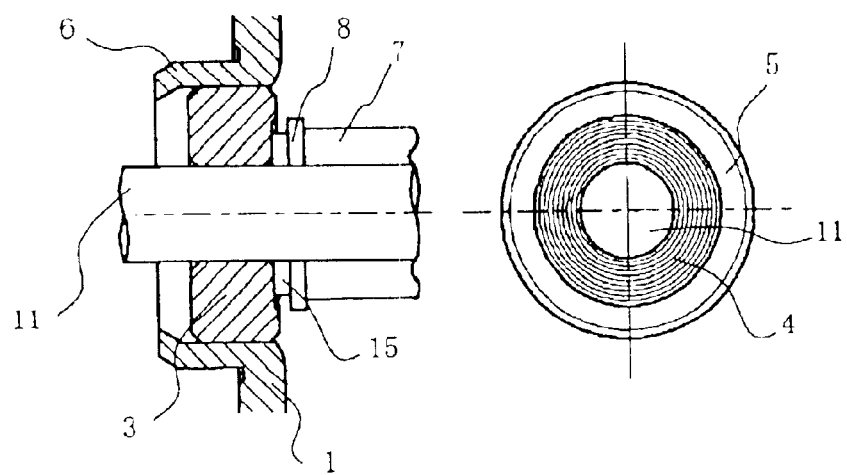
FIG. 2A is an enlarged sectional view of "A" of FIG. 1.
FIG. 2B is a view showing the end face of a bearing which abuts an adjustment washer.

FIG. 1 is a view exemplifying a miniature motor having a worm reduction-gear to which the present invention is applicable. FIGS. 2A and 2B show the detail of "A" of FIG. 1. Such a miniature motor can be used in an electric unit for driving, for example, an air conditioner damper for use in an automobile. In FIGS. 1 and 2, reference numeral 1 denotes a closed-bottomed cylindrical motor casing of metal. A magnet 2, which provides stator magnetic poles, is fixedly attached to the inner circumferential surface of the motor casing 1. A bearing support portion 6, which is a cylindrical protrusion for accommodating a bearing 3, is integrally formed at a central portion of the bottom of the motor casing 1. A casing cover 22 of metal is fitted to an open end portion of the motor casing 1. A support portion is integrally formed at a central portion of the casing cover 22. A bearing is press-fitted into the support portion, and a shaft stopper is accommodated within the support portion. Brushes 21 and terminals connected to the brushes 21 are attached to the casing cover 22 via a resin holder. A core 12, windings 13, and a commutator 14 are mounted on a shaft 11, thereby forming a rotor. Reference numeral 7 denotes a bushing of resin or metal for axially positioning the rotor. Reference numeral 8 denotes an oil stoppage washer. An adjustment washer 15 is sandwiched between the oil stoppage washer 8 and the bearing 3.

A worm 16, which partially constitutes a reduction gear, is firmly fitted to a distal end portion of the shaft 11 projecting outward from the motor casing 1. A helical gear 17, which serves as a worm wheel, is meshed with the worm 16. Drive torque output from the motor is transmitted to the worm 16 via the shaft 11, from the worm 16 to the helical gear 17 in the reduction gear, and from the helical gear 17 to an external load via an output shaft of the helical gear 17.

The above-described configuration is of an ordinary miniature motor, except for the structure of the bearing 3. The structure of the bearing 3 according to the present invention will be described with reference to FIGS. 2A and 2B showing the detail of "A" of FIG. 1. FIG. 2A is an enlarged sectional view of "A" of FIG. 1. FIG. 2B shows the end face of the bearing 3 which abuts the adjustment washer 15. As shown in FIGS. 2A and 2B, the bearing 3 of a sintered alloy is accommodated in the cylindrical bearing support portion 6, which is integrally formed at a central portion of the bottom of the metallic motor casing 1.

The bearing 3 is configured such that the entirety of the oil-impregnated end face thereof is substantially flat. In order to reduce frictional resistance on the self-lubricating end face of the bearing 3, at least a portion of the end face which abuts the washer 15 is concentrically polished so as to be smoothed in the circular direction. That is, the end face of the bearing 3 is not necessarily polished over the entire surface, but may be polished up to a diameter that is not greater than the outside diameter of the bearing 3 and slightly greater than the outside diameter of the adjustment washer 15. FIG. 2B shows the end face of the bearing 3. In FIG. 2B, reference numeral 4 denotes a concentrically polished portion, and reference numeral 5 denotes an unpolished portion.

Figures 3A, 3B:
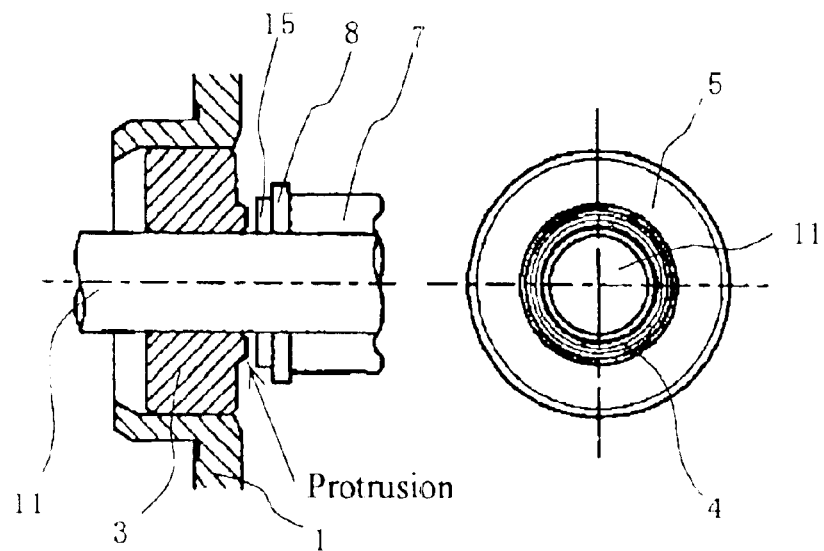
FIGS. 3A and 3B are views similar to FIGS. 2A and 2B, respectively, showing a modified example of the bearing.

FIGS. 3A and 3B are similar to FIGS. 2A and 2B, respectively, but show a modified example of the bearing 3. The bearing 3 of FIGS. 3A and 3B is configured such that a portion of its end face which abuts the adjustment washer 15 protrudes from the end face. The top face of the protrusion is flat. A through-hole is formed in the bearing 3 so as to allow the shaft 11 to extend therethrough. Only the flat top face of the protrusion abuts the adjustment washer 15. In application of the present invention to the bearing 3, the entire top face of the protrusion is concentrically polished.

Figure 4:
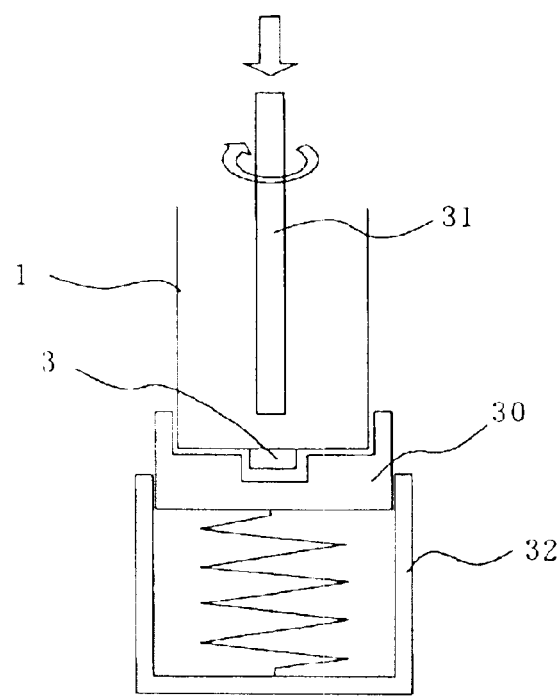
FIG. 4 is a view for explaining a method for concentrically polishing the end face of the bearing.

FIG. 4 is a view for explaining a method for concentrically polishing the end face of the bearing 3. The motor casing 1 is set in a casing rest 30 while the bearing 3 is accommodated in the bearing support portion 6 of the motor casing 1. Next, a rotating polishing rod 31 is coaxially pressed against the end face of the bearing 3 to thereby concentrically polish the end face. In this case, the diameter of a portion to be polished is greater than the outside diameter of the adjustment washer 15 and not greater than the outside diameter of the bearing 3. Polishing brings about a level difference between the polished portion and an unpolished portion. When the level difference between the polished portion and the unpolished portion falls within a range of 1 $\mu$m to 5 $\mu$m, the polishing amount can be judged to be optimal, because the rough end face of the bearing 3 can be completely smoothed without involvement of adverse effect on productivity, and an oil-producing porous portion can be left. When the level difference is insufficient, the end face remains rough, and thus an expected effect of polishing is not attained. When the level difference is excessively large, dust of polishing increases and raises a problem (e.g., generation of unusual noise). Further, polishing time increases, thereby impairing production efficiency. The above-mentioned degree of polishing is also applicable to the bearing 3 of FIG. 3. Since polishing reduces the height of the protrusion, the degree of polishing can be judged from the reduction of the height.

Preferably, the casing rest 30, in which the motor casing 1 is set, is not firmly fixed, but is rendered movable within a predetermined range, so that the end face of the bearing 3 is in full contact with that of the polishing bar 31 at all times in the process of polishing. Such movable arrangement can be attained, for example, in the following manner: the casing rest 30 is elastically supported in a support 32 by use of spring. If the casing rest 30 is immovable, and the motor casing 1 or the bearing 3 is inclined, the end face of the polishing rod 31 will unevenly abut that of the bearing 3. As a result, polishing cannot be performed in a complete circular area, but is performed in a semicircular or arcuate area.

Since only one end face of the bearing 3 must be polished, a selected end face of the bearing 3 is usually polished before attachment to the motor casing 1. However, this method requires an operator or system to confirm which end face has been polished, when the polished bearing 3 is attached to the motor casing 1, thereby impairing production efficiency. Therefore, polishing (in the circular direction) the bearing 3 after attachment to the motor casing 1 allows better handling and provides better production efficiency as compared with a case of polishing the bearing 3 before attachment to the motor casing 1.

FIG. 5 shows the results of a test conducted on motors which were configured under the following conditions.

Dimensions and characteristics of motor: motor casing diameter: 24 mm; motor casing length: 31 mm; shaft diameter: 2 mm; no-load rotational speed: 3000 rpm; stopping torque: 100 gf·cm; rated voltage: 12 V Bearing: oil-impregnated, sintered iron-copper bearing (an oil-impregnated, sintered porous bearing mainly formed of metal powder); outside diameter: 5.5 mm; inside diameter: 2.0 mm; thickness: 2.0 mm; lubricant: poly-$\alpha$-olefin oil Washer: material: polyethylene terephthalate (PET); outside diameter: 3.4 mm; inside diameter: 2.0 mm; thickness: 0.2 mm The motors which were configured under the above conditions according to the present invention were measured for the minimum startup voltage while the rotor was withdrawn toward the motor casing by a force of about 2 kgf. The measurement results are shown in FIG. 5 above the rightmost expression "POLISHED (CIRCULARLY) (PRESENT INVENTION)." As mentioned above, the motors are of a rated voltage of 12 V. However, FIG. 5 shows that the motors are started at an average voltage of 6.2 V, a maximum voltage of 7.1 V, and a minimum voltage of 5.5 V. Thus, the motors exhibit sufficient performance according to the standard (9 V or less).

The measurement results shown in FIG. 5 above the leftmost expression "UNPOLISHED (CONVENTIONAL)" are of the motors which were configured and measured under the same conditions as those mentioned above except that the bearings were not polished. FIG. 5 shows that the motors are too high in startup voltage to satisfy the standard (9 V or less).

The measurement results shown in FIG. 5 above the central expression "POLISHED (LINEARLY) (REFERENCE EXAMPLE)" are of the motors which were configured and measured under the same conditions as those mentioned above except that the bearings were polished linearly; specifically, the end faces of the bearings were polished linearly (the bearings were arranged linearly and polished along the linear direction of arrangement). In general terms, the motors show good measurement results; i.e., the motors satisfy the standard (9 V or less). However, some of the motors fail to satisfy the standard. In a word, mere polishing is insufficient. Polishing must be performed in the circular direction.

Employment of the present invention reduces a sliding loss on the bearing even when the washer is pressed against the bearing, so that the minimum startup voltage does not rise to a problematically high level, thereby avoiding a failure to start when the battery voltage drops as a result of low temperature.

What is claimed is:

1. A miniature motor comprising a closed-bottomed cylindrical motor casing having a cylindrical bearing support portion projecting from a central portion of a bottom of said motor casing, a motor-casing-side bearing accommodated in said bearing support portion, a casing cover fitted to an open end portion of said motor casing, a casing-cover-side bearing accommodated in a central portion of said casing cover, and a rotor rotatably supported by means of said motor-casing-side bearing and said casing-cover-side bearing, wherein an end face of said motor-casing-side bearing is concentrically polished in a circumferential direction at at least a portion wherein as said rotor is urged toward said motor casing, said polished portion abuts a washer provided on a shaft of said rotor.

2. A miniature motor according to claim 1, wherein the entire end face of said motor-casing-side bearing faces said washer and is substantially flat, and the polished portion of said end face has a diameter not greater than an outside diameter of said motor-casing-side bearing and slightly greater than an outside diameter of said washer.

3. A miniature motor according to claim 1, wherein a protrusion is formed on the end face of said motor-casing-side bearing, said protrusion faces said washer, and said protrusion having an entire surface that is polished and abuts said washer.

4. A miniature motor according to claim 1, wherein a drive torque output from said motor is transmitted to an electric unit via a worm reduction-gear comprising a worm fixedly attached to said rotor shaft and a worm wheel meshed with said worm.

* * * * *